United States Patent Office 3,394,052
Patented July 23, 1968

3,394,052
FERMENTATION PROCESS FOR MAKING
2 - (2,6 - DIHYDROXYBENZOYL) - x,x'-
DICHLOROPYRROLE
Richard J. O'Connor, John M. Van Deren, Jr., and Walter A. Darlington, St. Louis, Mo., assignors to Monsanto Company, a corporation of Delaware
No Drawing. Filed Oct. 30, 1963, Ser. No. 319,983
15 Claims. (Cl. 195—28)

ABSTRACT OF THE DISCLOSURE

A fermentation process for making 2-(2,6-dihydroxybenzoyl)-x,x'-dichloropyrrole, which is an antibiotic also known as Pyoluteorin, comprising carrying out an aerobic fermentation in an aqueous medium using a hydrocarbon as the carbon source.

This invention relates to a fermentation process for making 2 - (2,6-dihydroxybenzoyl)-x,x'-dichloropyrrole, which is an antibiotic also known as Pyoluteorin—Takeda, R. (1958), Structure of a New Antibiotic, Pyoluteorin; Journal of the American Chemical Society, 80, 4749.

A fermentation process for producing Pyoluteorin is known in the art as is evident from the following citation: Takeda, R. (1959), Pseudomonas Pigments. VIII. Production of Pyoluteorin by Fermentation of *Pseudomonas aeruginosa* T 359; Hakko Kogaka Zasski, 38, 9; Chemical Abstracts, 55 2997g (1961). The prior art process is discussed in some detail in the Chemical Abstract and it is indicated that the preferred carbon source for the Pyoluteorin is glycerol but glucose was also used as a carbon source.

It has now been discovered that hydrocarbons, aliphatic, cycloaliphatic and aromatic hydrocarbons, can be used as the carbon source in the fermentation process rather than glycerol or glucose as used in the prior art process. As a carbon source in this process hydrocarbons have several advantages over glycerol or glucose in that hydrocarbons are a cheaper source of energy and carbon with which bacteria can make Pyoluteorin.

It is an object of this invention to provide an improved fermentation process for producing Pyoluteorin.

This and other objects of the invention will become apparent as the detailed description of the invention proceeds.

In the fermentation process of the invention a soil organism which has been identified as *Pseudomonas aeruginosa* NRRL B-3071 was aerobically incubated or cultured (either grown or maintained) under fermentation conditions in an aqueous mineral salts medium using a hydrocarbon as the carbon source to produce Pyoluteorin. In addition to the carbon source the bacteria must be provided with sources for chlorine, hydrogen, nitrogen and oxygen to form Pyoluteorin and these are provided by conventional fermentation media such as are described in the 1959 Takeda article, supra. Actually the fermentation media used in the experiments described below varies somewhat from, but is quite similar to, the Takeda medium as will be seen when our medium is discussed in detail, except that the carbon source is a completely different kind of carbon source. The bacteria also need certain other ions to grow, such as phosphorus, sulfur, potassium, calcium, magnesium and iron, and these are provided by conventional fermentation media.

In our process preferred hydrocarbons to use as the carbon source are hydrocarbons containing not more than about 24 carbon atoms, such as n-pentane, n-hexane, 2-methylpentane, n-heptane, 3-methylhexane, n-octane, isooctane, n-decane, n-dodecane, n-hexadecane, n-eicosane, kerosene, pentene-1, 2-methylbutene-1, hexene-1, heptene-1, octene - 1, 3 - methylbutyne - 1, hexyne - 1, hexyne - 2, hexyne - 3, 3,3 - dimethylbutyne - 1, octadecyne - 1, cyclopentane, cyclohexane, cycloheptane, cyclooctane, cyclohexene, benzene, toluene, the xylenes, naphthalene α-methylnaphthalene, β-methylnaphthalene, anthracene, biphenyl, 2,2'-dimethylbiphenyl, 3,4-dimethylbiphenyl, 3,4'-dimethylbiphenyl, o-terphenyl, m-terphenyl, p-terphenyl, and mixtures of these aromatic hydrocarbons. Normally the aromatic hydrocarbons which will be used in the process are hydrocarbons such as benzene, toluene and the xylenes.

In the process of the invention the pH should be maintained in the range of 4.0 to 9.0, preferably in the range of 5.5 to 8.5. The pH is stabilized at about 6.1 by adding 1.5 g. of $CaCO_3$ per 100 ml. of medium. Also in the process if an aromatic carbon source such as benzene, toluene or a xylene is used concentration of the aromatic in the fermentation medium must not be too high or the bacteria will be killed. For example, if toluene is used as the carbon source the toluene concentration should not be so great in the fermentation flask that a separate layer of liquid toluene is found floating on the fermentation medium. That is, the toluene concentration during the fermentation should not exceed the solubility of toluene in the fermentation medium. Toluene concentration can be controlled during the fermentation by continuously or periodically adding toluene to replace that used up in the fermentation. A method which has been found quite satisfactory to provide toluene for the fermentation is to incorporate toluene in chunks of solid agar. These pieces of solid agar are then added to the fermentation vessel, and gradually release their toluene to the fermentation medium by diffusion out of the pieces of agar. A method of making these pieces of agar containing toluene is discussed in more detail below. It is preferred to carry the fermentation process out within a range of temperatures of about 25 to about 35° C.

The medium used in the experiments described in detail below was adjusted to pH 7.5 before use. On the basis of 100 ml. of medium consisting of distilled water and inorganic salts, the medium, except for the hydrocarbon separately added, had the following composition:

"A" SALTS

| | Grams |
|---|---|
| $Na_2HPO_4 \cdot 7H_2O$ | 0.4 |
| $KH_2PO_4$ | 0.2 |
| $(NH_4)_2SO_4$ | 0.8 |

"B" SALTS

| | Milligrams |
|---|---|
| $MgSO_4 \cdot 7H_2O$ | 6.0 |
| $FeSO_4 \cdot 7H_2O$ | 0.01 |
| $MnCl_2 \cdot 4H_2O$ | 7.0 |
| $CaCl_2 \cdot 2H_2O$ | 2.0 |
| $ZnCl_2$ | 0.2 |
| $Na_2MoO_4 \cdot 2H_2O$ | 0.2 |
| $CuSO_4 \cdot 5H_2O$ | 0.1 |
| $CoCl_2 \cdot 6H_2O$ | 0.1 |

The fermentation medium then consists of the salts in the amounts named above, and the balance distilled water, to make up 100 ml. of medium. The pH is adjusted to 7.5 using hydrochloric or sulfuric acid. The A and B groups of salts are available for mixing in different proportions depending on the particular fermentation which it is desired to carry out, and the preferred amounts to use in a particular fermentation are known to those skilled in the art or can readily be determined by them.

After the fermentation step the fermented mixture can be separated by extraction in a conventional manner with a solvent for Pyoluteorin which is not miscible with water, such as ether (e.g. diethyl ether), benzene, toluene, ethyl acetate, or the like. If desired, water can be removed completely from the extract containing the Pyoluteorin by treating the extract with anhydrous sodium sulfate or some other drying medium; however, this drying step is not necessary. The crude Pyoluteorin can also be dried after evaporating the solvent from the extract by treating the residue with absolute alcohol; however, this step is not necessary either. The Pyoluteorin can be crystallized from the solvent used to extract it from the fermentation medium by evaporation of a portion of the solvent to concentrate the extract and then cooling the concentrated extract to cause the Pyoluteorin to precipitate from the concentrated extract layer, or the solvent can be evaporated completely from the extract leaving crude Pyoluteorin residue. The crude Pyoluteorin whether obtained by crystallization from the extract or by evaporation of the solvent and recovery as a residue product, can be further purified by one or more recrystallizations from water, acetone/petroleum ether, or other solvent medium for Pyoluteorin.

Example 1

This example describes the isolation and maintenance of the culture of the bacterium *Pseudomonas aeruginosa* which is used in the process of the invention. This bacteria was isolated from soil in a conventional manner by suspending soil in distilled water, separating the water containing the bacteria from the soil and using this water to inoculate petri dishes containing the medium described above (to which 1.5 grams of agar had been added prior to sterilization). The dishes were then incubated in air which was ½ saturated with toluene. Growth was abundant after incubation of the dishes for 3 days at 30° C. The particular desired bacteria were separated from other bacteria growing on the mineral salts agar by conventional means.

To provide uniform stable inocula for the production of Pyoluteorin the bacterium was maintained as surface growth on semi-solid media in a cold room at 4–7° C. The surface cultures were prepared by inoculating 0.1 ml. of a water suspension of the bacteria on to the surface of 15–20 ml. of solidified mineral salts agar such as that described above, contained in a 90 mm. diameter petri dish. After the bacterial suspension was spread over the surface of the solidified agar, using a glass rod, the petri dishes were incubated for three days at 30° C. in a dessicator in which the air was one-half (½) saturated with toluene. The petri dishes were then removed from the dessicator after the three days' incubation, sealed with masking tape and stored in a cold room at 4–7° C. until they were needed.

The characteristics of the microorganism of this example were in agreement with those of *Pseudomanas aeruginosa* as listed in the 7th edition (1957) of Bergey's Manual for Determinative Bacteriology, authors—Breed, R. S., Murray, E. C. D., and Smith, N. R., publisher—Williams and Wilkins Co., Baltimore, Md.; no characteristics inconsistent with this interpretation have been uncovered.

Example 2

This example describes a preparation of Pyoluteorin by the process of the invention. Two-liter Erlenmeyer flasks containing 400 ml. of the mineral salt medium described in detail above were inoculated with 1.9 square centimeters of surface growth of the stock culture described in Example 1.

The substrate (toluene) used in the process of the invention was prepared as follows: 20 ml. of toluene was blended with 80 ml. of sterile molten agar, made up of 80 ml. of distilled water and 1.5 grams of agar. Using a cork borer, 2.5 cubic centimeter solid cylinders were cut from the solidified agar toluene blend and these cylinders had a radius of about 0.75 centimeter. To each flask was added 3 of these toluene containing agar cylinders. The mouth of the flask was closed by inserting a loose porous cotton plug in the neck of the flask. The flasks were then incubated at 30° C. on a rotary shaker for 4 to 5 day intervals. At daily intervals, the pH was adjusted to 7.5, using 1.0 normal sodium hydroxide and 3 additional agar-toluene cylinders were added. A sample was withdrawn for testing daily. After six days of incubation, the turbidity of this sample was 3.3 optical density units and when this sample was treated with diazotized p-nitroaniline a strong reaction was observed (Smith, I. 1958. Chromatographic Techniques; Clinical and Biochemical Applications. William Heinemann, Ltd., London.) The presence of Pyoluteorin was indicated and the culture medium was now ready for treatment to remove and purify the Pyoluteorin.

A satisfactory way to purify the culture medium is to acidify the medium to pH 2 with HCl and extract it with an equal volume of ethyl acetate. Other solvents for the Pyoluteorin which are well known can also be used as extractants. These are solvents such as either, benzene or other aromatic compounds. The ethyl acetate extract which has been separated from the culture medium is then extracted in a separatory funnel with a 1% aqueous solution of sodium bicarbonate to neutralize the acid. The ethyl acetate was then evaporated to dryness and the residue was taken up in 200 ml. of ethyl ether. This ethyl ether solution was extracted with 3–100 ml. volumes of 1% sodium bicarbonate solution. The ether layer was further extracted with 4–100 ml. volumes of 1% sodium carbonate and the ether phase was discarded. The sodium carbonate solution was adjusted to pH 2 and extracted with ether. The ether was then evaporated and a sample of the product taken up in ethanol and ultraviolet analysis was made of the ethanol solution of the sample and peaks were found at 307 and 252 millimicrons, which agrees with the information reported for Pyoluteorin in the Takeda R. 1958 article, supra. The Pyoluteorin can also be purified by repeated recrystallization from water or by crystallization from an acetone/petroleum ether mixture. It can also be purified by crystallization from any of other solvents for the Pyoluteorin, preferably with the aid of a counter-solvent by concentrating and cooling the solution in a conventional manner. It may be desirable to treat the solvent extract of the Pyoluteorin with, for example anhydrous sodium sulfate or some other drying medium to remove the water therefrom. Alternatively the residue from the evaporation of the extract layer can be treated with absolute ethanol to remove water present. The crystallized material will usually be separated by filtration or decantation from a liquid medium from which it was crystallized.

An elemental analysis of the recrystallized purified product of the process of the invention was as follows:

Calc'd for $C_{11}H_7O_3NCl_2$: C, 48.5%; H, 2.6%; Cl, 26.1%; N,5.1%; O, 17.6%. Found: C, 48.1%; H, 2.9%; Cl, 24.9%; N, 5.0%; O, 17.6%.

Example 3

To each of sixteen 2-liter Erlenmeyer flasks containing 350 ml. of the same type of mineral salt agar medium used for Example 2 were added 50 ml. of the culture medium made in Example 2 after the six days of incubation and prior to the acid treatment step. This culture medium of Example 2 served as the source of bacteria to inoculate the experiments of Example 3. Three agar-toluene cylinders similar to those described in Example 2 were added to each flask at the beginning of the incubation period. Incubation was carried out at 30° C. with agitation being provided by a rotary shaker. Each flask was closed by a loose porous cotton plug in the neck of the flask. Each day of the incubation three additional agar-toluene cylinders were added to each flask. The pH was adjusted in each flask to 7.5 using 1.0 normal sodium hydroxide after two, four and five days of incubation. After six days of incubation an intense diazotized p-nitroaniline spot test for Pyoluteorin indicated that a substantial amount of this material had been produced. The flasks were then removed from the shaker, acidified, and the Pyoluteorin was extracted from the fermented mixture by methods similar to those used in Example 2. The Pyoluteorin was purified by repeated recrystallizations in a similar manner to that described in Example 2. The melting point of the product was about 174° C.

An experiment was also carried out using benzene rather than toluene as the substrate or carbon source and a mixed melting point of the product of the fermentation with benzene substrate with the product from the toluene substrate indicated no melting point depression and so that the products were the same. Elemental analysis and ultraviolet spectrum checking the literature reference, Takeda, R. (1958), supra, indicated that the product of our process was Pyoluteorin.

Example 4

An experiment was carried out in a manner similar to Example 2 using n-decane rather than toluene as the carbon source. In this experiment the concentration of $FeSO_4 \cdot 7H_2O$ was 1 mg. per 100 ml. of medium rather than 0.01 mg. as in Example 2. Also the method of addition of the hydrocarbon was different. The n-decane was added to the medium periodically during the fermentation in liquid form rather than incorporated in chunks of agar as with toluene. Decane, unlike toluene, is not toxic to the microorganisms and can be added to the fermentation medium in excess of its solubility in the medium without killing the microbes. It should also be noted that polycyclic aromatics, like decane, can also be added to the fermentation medium in excess of their solubility in the medium without deleterious effects on the microorganisms. A good yield of Pyoluteorin resulted.

Example 5

This experiment was carried out in a manner similar to Example 4 above, except n-hexadecane was used as the carbon source rather than n-decane. A good yield of Pyoluteorin resulted.

Example 6

This experiment was carried out in a similar manner to Example 4 above, except kerosene was used as the carbon source rather than n-decane. A good yield of Pyoluteorin resulted.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. In a fermentation process for making a compound of the formula 2-(2,6-dihydroxybenzoyl)-x,x'-dichloropyrrole wherein a soil organism *Pseudomonas aeruginosa* NRRL B–3071 is aerobically cultured under fermentation conditions in an aqueous mineral salts medium, including carbon, chlorine, oxygen and nitrogen sources required for making the compound, the improvement wherein the carbon source is a hydrocarbon.

2. A process of claim 1 wherein said organism is growth in said medium.

3. A process of claim 1 wherein said carbon source is benzene.

4. A process of claim 1 wherein said carbon source is toluene.

5. A process of claim 1 wherein said carbon source is n-decane.

6. A process of claim 1 wherein said carbon source is n-hexadecane.

7. A process of claim 1 wherein said carbon source is kerosene.

8. A process of claim 1 wherein the fermentation is carried out at a temperature in the range of about 25° to about 35° C.

9. A process of claim 1 wherein the fermentation is carried out at a temperature of about 30° C. and said carbon source is toluene.

10. A process of claim 1 wherein said hydrocarbon is present in said medium in an amount insufficient to saturate said medium.

11. A process of claim 1 wherein after the fermentation said compound is separated from said medium and purified by extraction and crystallization.

12. In a fermentation process for making a compound of the formula 2-(2,6-dihydroxybenzoyl)-x,x'-dichloropyrrole wherein a soil organism *Pseudomonas aeruginosa* NRRL B–3071 is grown under aerobic fermentation conditions at a temperature in the range of about 25° to about 35° C. in an aqueous mineral salts medium, including carbon, chlorine, oxygen and nitrogen sources required for making the compound, the improvement wherein said carbon source is a monocyclic aromatic hydrocarbon which is present in said medium in an amount insufficient to saturate said medium.

13. A process of claim 12 wherein said carbon source is toluene and said fermentation is carried out at about 30° C.

14. A process of claim 12 wherein said carbon source is benzene and said fermentation is carried out at about 30° C.

15. A process of claim 12 wherein after the fermentation said compound is separated from said medium and purified by extraction and crystallization.

References Cited

UNITED STATES PATENTS

| | | | |
|---|---|---|---|
| 3,084,106 | 4/1963 | Hitzman et al. | 195—51 |
| 3,219,543 | 11/1965 | Douros et al. | 195—1 |
| 3,222,258 | 12/1965 | Iizuka et al. | 195—29 |

OTHER REFERENCES

Takeda, R.: Chemical Abstracts 55 2997g to 2998b (1961).

Shiio et al.: Journal General Applied Microbiology, vol. 9, No. 1, pp. 23–30 (1963).

LIONEL M. SHAPIRO, *Primary Examiner.*